United States Patent
Oosterling

(12) 
(10) Patent No.: US 6,363,884 B1
(45) Date of Patent: Apr. 2, 2002

(54) DEVICE FOR PREPARING CLEANING LIQUID FOR A MILKING DEVICE, AND A CLEANING AGENT, FOR EXAMPLE FOR USE IN THE DEVICE

(75) Inventor: Pieter Adriaan Oosterling, Nieuw-Vennep (NL)

(73) Assignee: Prolion B.V. (NL)

( * ) Notice: Subject to any disclaimer, the term of this patent is extended or adjusted under 35 U.S.C. 154(b) by 0 days.

(21) Appl. No.: 09/463,039

(22) PCT Filed: Jul. 15, 1998

(86) PCT No.: PCT/NL98/00410

§ 371 Date: Jan. 14, 2000

§ 102(e) Date: Jan. 14, 2000

(87) PCT Pub. No.: WO99/03333

PCT Pub. Date: Jan. 28, 1999

(30) Foreign Application Priority Data

Jul. 15, 1997 (NL) .............................. 1006584

(51) Int. Cl.[7] .............................. A01J 7/02; B08B 3/08
(52) U.S. Cl. ...................................... 119/14.08; 134/93
(58) Field of Search ................... 119/14.08, 14.02; 134/99.2, 93; 137/88; 510/446, 234, 218

(56) References Cited

U.S. PATENT DOCUMENTS

| | | | |
|---|---|---|---|
| 3,178,915 A | | 4/1965 | Hertel .............................. 68/17 |
| 3,828,975 A | * | 8/1974 | Robandt II et al. .......... 222/651 |
| 4,110,075 A | | 8/1978 | Graf et al. ...................... 8/137 |
| 4,219,436 A | * | 8/1980 | Gromer et al. .............. 510/224 |
| 4,365,853 A | * | 12/1982 | Ehrlich ........................ 312/42 |
| 4,587,031 A | * | 5/1986 | Kruse et al. ................. 510/224 |
| 5,205,955 A | * | 4/1993 | Bunczk et al. ............... 510/192 |
| 5,342,550 A | * | 8/1994 | Burke et al. ................. 510/445 |
| 6,079,359 A | * | 6/2000 | van den Berg .......... 119/14.01 |
| 6,083,895 A | * | 7/2000 | Warwick ..................... 510/224 |
| 6,164,296 A | * | 12/2000 | Lentsch et al. ............. 134/25.2 |
| 6,177,398 B1 | * | 1/2001 | McGregor et al. .......... 510/446 |
| 6,187,740 B1 | * | 2/2001 | Bettiol et al. ............... 510/392 |
| 6,197,739 B1 | | 3/2001 | Oakes et al. ................. 510/392 |

FOREIGN PATENT DOCUMENTS

| | | | |
|---|---|---|---|
| DE | 3209333 | | 9/1983 |
| DE | 3227817 | | 1/1984 |
| DE | 3442470 A1 | * | 5/1986 ..................... 83/4 |
| DE | 19540958 | | 5/1997 |
| EP | 0127271 | | 12/1984 |
| EP | 0399604 | | 11/1990 |
| WO | 9423564 | | 10/1994 |

OTHER PUBLICATIONS

"Chemie fur Haus and Garten," Vollmer, G. and Franz, M., p. 81, Munich, 1994.

International Search Report dated Oct. 14, 1998 (3 pp.).

International Preliminary Examination Report dated Oct. 1, 1999 (11 pp.)

* cited by examiner

*Primary Examiner*—Yvonne Abbott
*Assistant Examiner*—Yvonne R. Abbott
(74) *Attorney, Agent, or Firm*—Webb Ziesenheim Logsdon Orkin & Hanson, P.C.

(57) ABSTRACT

A device for preparing cleaning liquid in a buffer vessel, which can be used to clean a milking device. The cleaning agent is supplied as a powder, possibly in tablet form, and is metered into a mixing vessel which may form part of the buffer vessel. Consequently, the cleaning liquid is easier to prepare, since there is less risk of spilling the aggressive substances, and the packaging can easily be thrown away.

13 Claims, 1 Drawing Sheet

DEVICE FOR PREPARING CLEANING LIQUID FOR A MILKING DEVICE, AND A CLEANING AGENT, FOR EXAMPLE FOR USE IN THE DEVICE

BACKGROUND OF THE INVENTION

1. Field of the Invention

The invention relates to a device for preparing a cleaning liquid for a milking device. The device includes a buffer vessel for cleaning liquid, a metering system for a cleaning agent, a water feed and a mixing vessel for mixing the cleaning agent with the water supplied, which mixing vessel is provided with an outlet to the buffer vessel and may optionally form part of the buffer vessel.

2. Description of the Prior Art

Devices of this kind are known, for example, from EP-A-0 399 604, filed by the same applicant, in which hot water can be metered into a vessel and cleaning agent is metered using the pump. The cleaning agent is supplied to the farmer in a container which contains the cleaning agent in liquid form. It is drawn out of the container by means of the pump. The cleaning agents are generally more or less aggressive substances which have to be handled very carefully, since otherwise spillage can damage clothing and the like. Also, empty containers are contaminated to such an extent that they have to be treated as chemical waste and disposed of as such.

SUMMARY OF THE INVENTION

The object of the invention is to avoid these drawbacks and, to this end, the metering system comprises a chamber for storing dry cleaning agent, as well as metering means, which are connected to the chamber, for metering an adjustable quantity of dry cleaning agent into the mixing vessel. Due to the fact that the cleaning agents are supplied and metered in dry form, there is less risk of spillage and the packaging also causes less contamination.

According to a further improvement, the cleaning agent is in tablet form. By pressing the cleaning agent into tablets, it is made easy to handle and manipulate without loose material being released, with the result that the cleaning agent can be removed from the packaging and metered in a simple manner.

According to a further improvement, the metering means are provided with a metering slide for removing at least one tablet of cleaning agent from the chamber and moving it to the mixing vessel. As a result, cleaning agent can be metered in a simple manner.

According to a further improvement, the metering means are provided with sealing means for sealing off the chamber from steam. Consequently, the cleaning agents in the chamber cannot be wetted by moisture from the mixing vessel or from the humid atmosphere in a milking shed.

According to one embodiment of the invention, the metering slide comprises an opening which can be moved from a first position, in which the opening is in communication with the chamber, to a second position, in which the opening is in communication with the mixing vessel. This prevents open communication between the chamber and the mixing vessel, so that there is no possibility of moisture from the mixing vessel passing into the chamber.

According to a further improvement of the invention, the metering means and the water feed are provided with operating means for automatically metering cleaning agent and water, respectively, into the mixing vessel. As a result, it is possible for the user to prepare cleaning liquid in a simple manner.

The invention also relates to a milking device which is provided with a control system for an automatically operating cleaning system, in which according to a further improvement the operating means are coupled to the control system of the automatically operating cleaning system. As a result, it is possible to clean the milking system automatically.

According to one embodiment of the invention, the mixing vessel is provided with two or more metering systems containing at least two types of cleaning agent. As a result, cleaning can be carried out in sequence with, for example, an acidic cleaning agent, which allows systems containing at least two types of cleaning agent. As a result, cleaning can be carried out in sequence with, for example, an acidic cleaning agent, which allows the lines to be descaled, and an alkaline cleaning agent for fat-dissolving. It is also possible to add, for example, a disinfectant at the same time as the alkaline cleaning agent, using a third metering system.

According to one embodiment of the invention, the chamber is formed by a casing which is closed at the top and is positioned in a sealing ring. As a result, a sealed chamber is formed in a simple manner.

According to a further embodiment of the invention, the metering system is provided with indicator means for displaying the amount of cleaning agent present in the chamber.

The invention also relates to a cleaning agent for alkaline cleaning a milking device comprising alkaline agent such as caustic soda combined with wetting agent. According to the invention the cleaning agent is distributed and stored before use as a combination tablet comprising the agent for alkaline cleaning and a disinfectant. By combining the alkaline agent, the wetting agent and the disinfectant in a tablet these agents always have the desired ration of concentration, which is advantageous when cleaning a milking device.

The invention further relates to a casing with cleaning agent for cleaning a milking device. According to the invention the cleaning agent comprises tablets for alkaline cleaning and tablets for acidic cleaning whereby the tablets are placed on the casing in the sequence of desired used. In this it is ensured that the different cleaning agents are used in the correct order for optimal cleaning results.

BRIEF DESCRIPTION OF THE DRAWINGS

The invention will be explained below with reference to a number of exemplary embodiments which are discussed with reference to a drawing, which shows a diagrammatic view of a metering device with a mixing vessel.

DETAILED DESCRIPTION OF THE PREFERRED EMBODIMENTS

Figure 1:
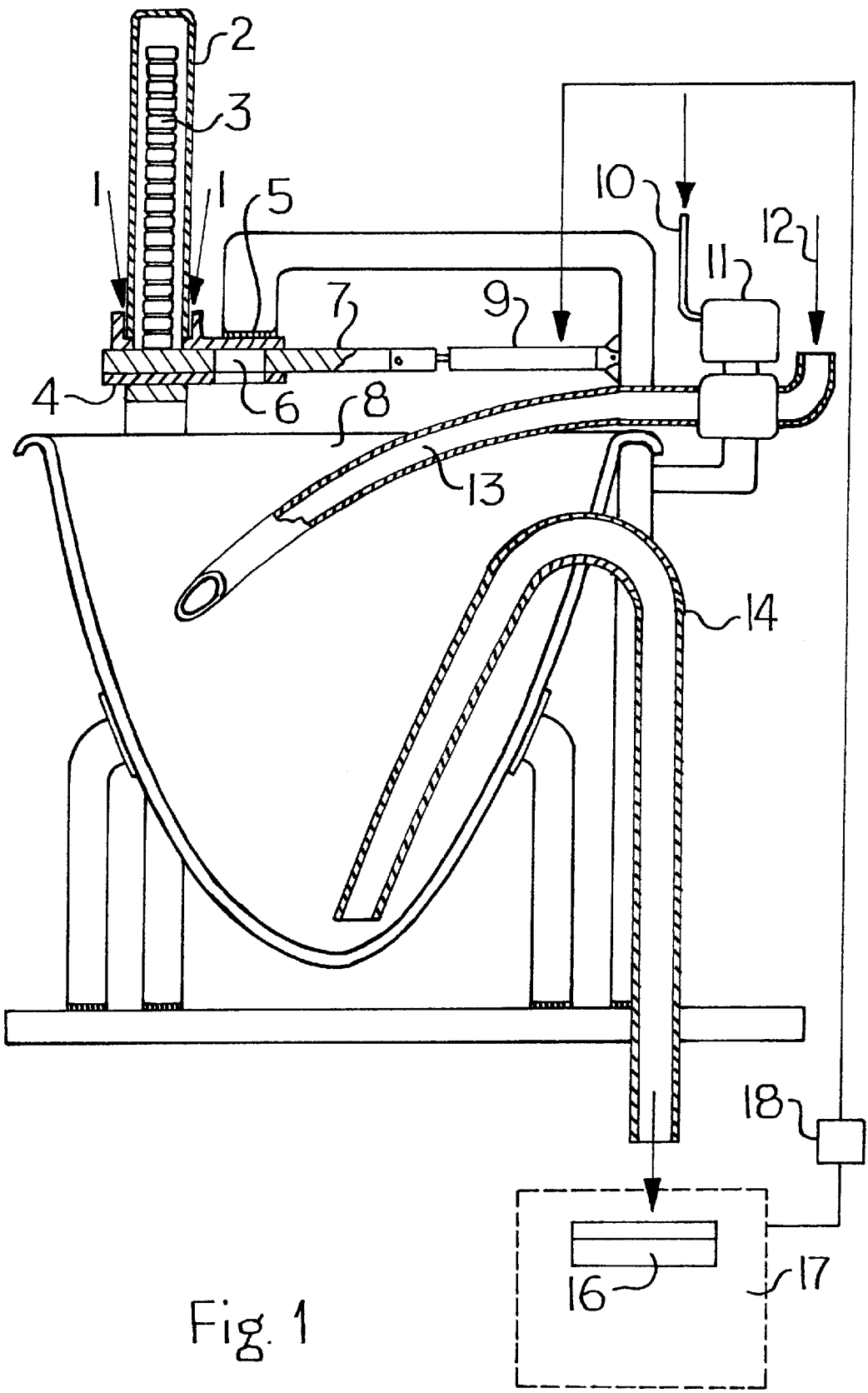

A mixing vessel 8 is positioned above a buffer vessel 16. The mixing vessel 8 can be filled via a water feed 12 and via an electrically operated valve 11, using a metering pipe 13. When the water level in the mixing vessel 8 has risen above a defined level, the vessel is emptied by the siphon effect using a siphon line 14. The siphon line 14 is arranged in the cover of the buffer vessel 16. A metering device is arranged above the mixing vessel 8, which metering device comprises a housing 5, an which a casing 2 is positioned via a connection opening with a seal 1. A metering slide 7 can be moved in the horizontal direction in the housing 5 using a drive 9. A metering opening 6 is formed in the metering slide 7, which opening can communicate in sequence with an opening in the housing 5 into the mixing vessel 8 and an opening in the housing 5 into the connection opening 1 holding the casing 2. A stack of tablets 3 which fit into the metering opening 6 in the metering slide 7 is positioned in the casing 2. By moving the metering slide in the horizontal direction, in each case one tablet is moved from the casing 2 into the mixing vessel 8. A seal 4 is arranged around the metering slide 7, in the housing 5. As a result, it is impossible for any moisture to penetrate along the metering slide 7 into the casing 2 when the metering opening 6 has been moved to above the mixing vessel. On its open side, the casing 2 is provided on the outside with a smooth rim which interacts with the seal of the connection opening 1, so that it is also impossible for any moisture to penetrate into the casing 2 by this route. As a result, the tablets 3 in the casing 2 remain as dry as possible.

The device functions as follows. One or more tablets 3 are moved into the mixing vessel 8 via a control system 18 using the drive 9. This is achieved by moving the metering slide 7 in the horizontal direction, with the result that one tablet each time falls into the mixing vessel 8. Via an operating cable 10, a signal is then transmitted to the electrically operated valve 11, which consequently opens, causing water to flow out of the water feed 12 into the mixing-vessel 8. This water is preferably hot water at a temperature of approximately 80 to 90° C., with the result that the tablets 3 dissolve rapidly. After the mixing vessel 8 has been almost filled, meaning that approximately one litre of hot water has flowed in, and after the tablets 3 have been dissolved, the liquid will flow out of the mixing vessel 8, via the siphon line 14, into the buffer vessel 16. The buffer vessel 16 is then filled to the desired level by keeping the valve 11 open for a sufficient period of time or by filling the buffer vessel 16 with hot water in a different way. The buffer vessel 16 has a volume of, for example, from 70 to 120 litres and is connected in a known manner to a milking system, which is not shown in more detail and may be designed in a known manner. The liquid can be removed from the buffer vessel 16 in a known manner and circulates through the milking system 17, cf. also in this regard the abovementioned application EP 0 399 604, for example.

The milking system 17 may be a simple milking installation, in which case the user starts the cleaning cycle himself, but may also be an automatically operating milking system which is periodically cleaned using an automatic system, as is employed, for example, with a milking robot.

To clean a milking system, acidic cleaning and alkaline cleaning are employed in sequence. For acidic cleaning, which takes place, for example, every 2 to 3 days, sulfamic acid is used, for example 3 tablets containing a total of 60 grams of acid are used.

For the alkaline cleaning, use is made of a combination of caustic soda, for example 40 grams, and, for example, 40 grams of disinfectant, such as sodium dichloroisocyanate. The alkaline cleaning is carried out daily and is alternated with an acidic cleaning which takes place, for example, every 4th cleaning operation. The tablets employed have a diameter of 34 mm and each weigh approximately 20 grams. The internal diameter of the casing 2 in which the tablets 3 are stored is, for example, approximately 40 mm.

Wetting agents are added to the caustic soda tablets, so that a fat-emulsifying action is generated. This is important in particular for milking installations in which milking continues throughout the day, such as for example in the case of automatic milking devices in which the milking cups are automatically attached to the cows' udders using a robot.

Since the buffer vessel 16 has to be provided with various cleaning agents, it is possible for a plurality of metering systems to be positioned above the buffer vessel. In this case, use may be made of, for example, three identical metering systems with three mixing vessels 8, with different tablets positioned in each metering system. It is also conceivable to position, for example, three casings with three metering slides 7 above a mixing vessel, or to design the metering slide 7 in such a manner that different tablets can be taken from different casings at the same time or in sequence.

According to another embodiment of the device, the cleaning agents which are used for one cleaning cycle are combined to form a single combination tablet. This means that in this case, by way of example, the caustic soda and the disinfectant are combined in a single tablet, with separating means, for example, such as a separating layer of neutral substance being arranged between the caustic soda and the disinfectant. It is also possible to package the acidic and alkaline cleaning agents in one casing, in which case the different substances are packaged, for example, in water-soluble film in order to avoid undesirable reactions between the substances. In this case, the tablets 3 are placed in the casing 2 in the desired order, with one dose (for example of three tablets) of acidic cleaning agent being positioned after every three doses (for example of three combination tablets) of alkaline cleaning agent. As a result, the desired cleaning takes place regularly in the desired order.

In order to avoid errors when metering cleaning agent, the device may also be provided with a system which indicates how much cleaning agent is still present. This may be a simple mechanical indicator displaying the number of tablets in the casing; if appropriate, it may also be a mechanical counter which indicates the number of times that the metering slide has metered tablets. Another way of displaying the quantity can be realized using the control system 18 which records how many tablets have been metered since the last time that a new casing containing tablets was put in place. It is also possible for means which indicate how much powder is still present to be present in systems which use powder instead of tablets.

In another embodiment of the metering device, the mixing vessel 8 is omitted and the tablets are metered directly into the buffer vessel 16. In this embodiment, it is assumed that the tablets 3 dissolve immediately in the hot water, and if appropriate additional measures are employed, such as a separate mixing chamber in the buffer vessel 16 or, if appropriate, an agitator.

What is claimed is:

1. A device for preparing a cleaning liquid for a milking device, comprising a buffer vessel for cleaning liquid, a metering system for a cleaning agent, a water feed and a mixing vessel for mixing the cleaning agent with the water supplied, which mixing vessel is provided with an outlet to the buffer vessel, wherein the metering system comprises a chamber for storing dry cleaning agent, as well as metering means, which are connected to the chamber for metering an adjustable quantity of the dry cleaning agent into the mixing vessel.

2. The device according to claim 1, wherein the chamber for the dry cleaning agent is suitable for tablets.

3. The device according to claim 2, wherein the metering means are provided with a metering slide for removing at least one tablet of the cleaning agent from the chamber and moving it to the mixing vessel.

4. The device according to claim 3, wherein the metering slide defines an opening movable from a first position in which the opening is in communication with the chamber, to a second position in which the opening is in communication with the mixing vessel.

5. The device according to claim 2, wherein the metering means are provided with sealing means for sealing off the chamber from vapor.

6. The device according to claim 1, wherein the metering means are provided with sealing means for sealing off the chamber from vapor.

7. The device according to claim 6, wherein the metering means are provided with a metering slide for removing at least one tablet of the cleaning agent from the chamber and moving it to the mixing vessel.

8. The device according to claim 1, wherein the metering means and the water feed are provided with operating means for automatically metering the cleaning agent and water, respectively, into the mixing vessel.

9. The device according to claim 8, wherein the milking device is provided with a control system for an automatically operating cleaning system, and wherein the operating means are coupled to the control system of the automatically operating cleaning system.

10. The device according to claim 1, wherein the mixing vessel is provided with at least two metering systems containing at least two types of cleaning agent.

11. The device according to claim 1, wherein the chamber is formed by a casing which is closed at the top and is positioned in a sealing ring.

12. The device according to claim 1, wherein the metering system is provided with indicator means for displaying the amount of cleaning agent present in the chamber.

13. The device according to claim 1, wherein the mixing vessel is formed as part of the buffer vessel.

* * * * *

UNITED STATES PATENT AND TRADEMARK OFFICE
CERTIFICATE OF CORRECTION

PATENT NO. : 6,363,884 B1  Page 1 of 1
DATED : April 2, 2002
INVENTOR(S) : Pieter A. Oosterling It is certified that error appears in the above-identified patent and that said Letters Patent is hereby corrected as shown below:

<u>Title page, Item [54] and Column 1, lines 1-4,</u>
In the title, delete ", AND A CLEANING AGENT, FOR EXAMPLE FOR USE IN THE DEVICE"

<u>Column 2,</u>
Lines 12-15, delete the sentence "As a result, cleaning can be carried out in sequence with, for example, an acidic cleaning agent, which allows systems containing at least two types of cleaning agent."
Line 63, "an which" should read -- on which --.

<u>Column 3,</u>
Line 5, after "metering slide" insert -- 7 --.
Line 24, between "mixing" and "vessel" delete hyphen (-).

Signed and Sealed this

Second Day of July, 2002

Attest:

JAMES E. ROGAN
Attesting Officer    Director of the United States Patent and Trademark Office